(12) United States Patent
Kim

(10) Patent No.: US 9,209,447 B2
(45) Date of Patent: Dec. 8, 2015

(54) SECONDARY BATTERY MODULE

(75) Inventor: Yongsam Kim, Suwon-si (KR)

(73) Assignees: SAMSUNG SDI CO., LTD., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 934 days.

(21) Appl. No.: 12/662,361

(22) Filed: Apr. 13, 2010

(65) Prior Publication Data

US 2010/0266889 A1 Oct. 21, 2010

(30) Foreign Application Priority Data

Apr. 16, 2009 (KR) ........................ 10-2009-0033038

(51) Int. Cl.
*H01M 2/20* (2006.01)
*H01M 2/02* (2006.01)
(52) U.S. Cl.
CPC ............ *H01M 2/202* (2013.01); *H01M 2/0257* (2013.01)
(58) Field of Classification Search
CPC ........................... H01M 2/202; H01M 2/0257
USPC ................... 429/158, 160, 149, 122; 320/116
See application file for complete search history.

(56) References Cited

U.S. PATENT DOCUMENTS

| | | | | |
|---|---|---|---|---|
| 3,862,861 A | * | 1/1975 | McClelland et al. | 429/57 |
| 4,346,151 A | * | 8/1982 | Uba et al. | 429/54 |
| 6,391,489 B1 | * | 5/2002 | Winch et al. | 429/121 |
| 2006/0063067 A1 | * | 3/2006 | Kim | 429/148 |
| 2008/0199765 A1 | | 8/2008 | Yoon et al. | |

FOREIGN PATENT DOCUMENTS

| | | | |
|---|---|---|---|
| JP | 09-190811 A | 7/1997 | |
| JP | 2005-327677 A | 11/2005 | |
| JP | 2007-323951 A | 12/2007 | |
| JP | 2007-324004 A | 12/2007 | |
| JP | 2008-251352 | * 10/2008 | .............. H01M 2/10 |
| KR | 10 2005-0106541 A | 11/2005 | |
| KR | 10 2007-0043501 A | 4/2007 | |
| KR | 10 2007-0080871 A | 8/2007 | |

OTHER PUBLICATIONS

Korean Notice of Allowance in KR 10-2009-0033038, dated Jun. 27, 2011 (Kim).
Korean Office Action in KR 10-2009-0033038, dated Oct. 11, 2010 (Kim).

* cited by examiner

*Primary Examiner* — Patrick Ryan
*Assistant Examiner* — Aaron Greso
(74) *Attorney, Agent, or Firm* — Lee & Morse, P.C.

(57) ABSTRACT

A secondary battery module including a plurality of unit batteries, each including a first terminal and a second terminal, and a plurality of bus bars, each electrically connecting the first terminal of one of the unit batteries to the second terminal of an adjacent unit battery, wherein the first terminal and second terminal each include a first contact surface and a second contact surface opposite to the first contact surface, the bus bars include a first coupling portion in contact with the first contact surface and the second contact surface of the first terminal of one of the unit batteries, a second coupling portion in contact with the first contact surface and the second contact surface of the second terminal of an adjacent unit battery and a connecting portion connecting the first and second coupling portions.

8 Claims, 12 Drawing Sheets

SECONDARY BATTERY MODULE

BACKGROUND

1. Field

Embodiments relate to a secondary battery module.

2. Description of the Related Art

A typical secondary battery module may include a plurality of unit batteries connected in series. The unit batteries may be secondary batteries. Each of the unit batteries may include an electrode assembly, a case having a space therein, a cap assembly coupled to the case to seal the case, and positive and negative terminals protruding through the cap assembly and electrically connected to positive and negative electrode collectors in the electrode assembly, respectively. The electrode assembly may include a separator interposed between a positive electrode and a negative electrode. The electrode assembly may be accommodated in the space of the case.

The positive and negative terminals of adjacent unit batteries may be connected to each other with, e.g., bus bars to achieve high capacity of the battery module. In the typical secondary battery module, the conductive bus bars may be fitted on male threaded positive and negative terminals of the adjacent unit batteries. Nuts may be screwed onto the positive and negative terminals to fix the bus bars to the positive and negative terminals. Due to this construction, the unit batteries are connected in series with each other.

SUMMARY

Embodiments are directed to a secondary battery module, which substantially overcomes one or more of the drawbacks, limitations and/or disadvantages of the related art.

It is a feature of an embodiment to provide a secondary battery module in which the terminals of the unit batteries are precisely joined to bus bars by laser or ultrasonic welding to prevent short circuits between the terminals.

It is another feature of an embodiment to provide a secondary battery module including clip-type bus bars whose height is easily controlled and maintained and whose position is temporarily fixed before welding of the bus bars to terminals.

It is another feature of an embodiment to provide a secondary battery module that is not affected by differing distances between unit batteries, which may be accomplished by varying the thickness of connecting portions of bus bars, varying the connection structures between the connecting portions and first coupling portions and between the connecting portions and second coupling portions, and/or structurally modifying (e.g., corrugating and/or bending) the connecting portions.

At least one of the above and other features and advantages may be realized by providing a secondary battery module including a plurality of unit batteries, each including a first terminal and a second terminal, and a plurality of bus bars, each electrically connecting the first terminal of one of the unit batteries to the second terminal of an adjacent unit battery, wherein the first terminal and second terminal each include a first contact surface and a second contact surface opposite to the first contact surface, and the bus bars include a first coupling portion in contact with the first contact surface and the second contact surface of the first terminal of one of the unit batteries, a second coupling portion in contact with the first contact surface and the second contact surface of the second terminal of an adjacent unit battery and a connecting portion connecting the first and second coupling portions.

The bus bars may further include a first bent portion between the first coupling portion and the connecting portion, and a second bent portion between the second coupling portion and the connecting portion.

The first coupling portion of the bus bar may include a first contact portion having an inner side surface in contact with the first contact surface of the first terminal, a second contact portion having an inner side surface in contact with the second contact surface of the first terminal, and an elastic fixing portion connecting the first contact portion to the second contact portion, and the second coupling portion of the bus bar may include a third contact portion having an inner side surface in contact with the first contact surface of the second terminal, a fourth contact portion having an inner side surface in contact with the second contact surface of the second terminal, and an elastic fixing portion connecting the third contact portion to the fourth contact portion.

The bus bars may be arranged such that the second contact portion of the first coupling portions face the fourth contact portions of the second coupling portions.

The first and second terminal may each have an upper surface having a central portion, the first fixing portion of the first coupling portion may at least partially overlie the upper surface of the first terminal and exposes the central portion of the upper surface, and the second fixing portion of the second coupling portion may at least partially overlie the upper surface of the second terminal and exposes the central portion of the upper surface.

The first and second terminal may each have an upper surface, the upper surface of the first terminal may be welded to at least one of the first and second contact portions of the first coupling portion of the bus bar, and the upper surface of the second terminal may be welded to at least one of the third and fourth contact portions of the second coupling portion of the bus bar.

The first contact portion may have a first end, the third contact portion may have a first end and the first end of the first contact portion may be directly opposite to the first end of the third contact portion, and the bus bar may have a "U" configuration by which the connecting portion connects the first end of the first contact portion to the opposing first end of the third contact portion.

The connecting portion may include a first connecting portion connected to the first coupling portion, a second connecting portion connected to the second coupling portion, and a bent third connecting portion connecting the first connecting portion to the second connecting portion.

The bent third connecting portion may be corrugated.

The first contact portion of the first coupling portion of each bus bar may have a first end, the third contact portion of the second coupling portion may have a second end and the first end may be diagonally opposed to the second end, and each bus bar may have a zigzag configuration in which the connecting portion connects the first end of the first contact portion of the first coupling portion to the diagonally opposed second end of the third contact portion of the second coupling portion.

The second contact portion of the first coupling portion of each bus bar may have a first end, the fourth contact portion of the second coupling portion may have a second end and the first end may be diagonally opposed to the second end, and each bus bar may have a zigzag configuration in which the connecting portion connects the first end of the second contact portion of the first coupling portion to the diagonally opposed second end of the fourth contact portion of the second coupling portion.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1A:
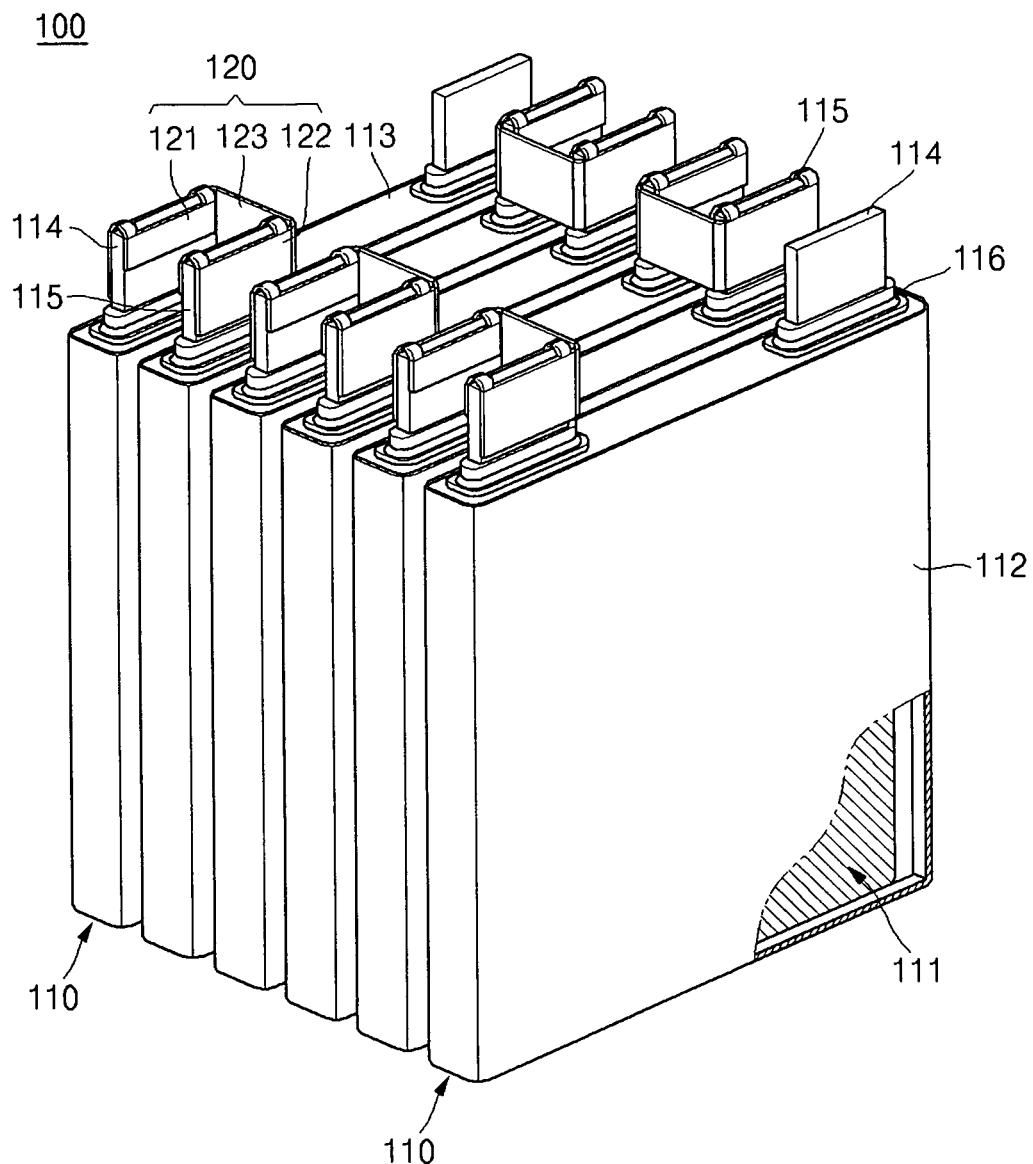
FIGS. 1a through 1c respectively illustrate a perspective view, a partially enlarged view and a partial cross-sectional view of a secondary battery module according to an embodiment.

Korean Patent Application No. 10-2009-0033038, filed on Apr. 16, 2009, in the Korean Intellectual Property Office, and entitled: "Secondary Battery Module," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1B:
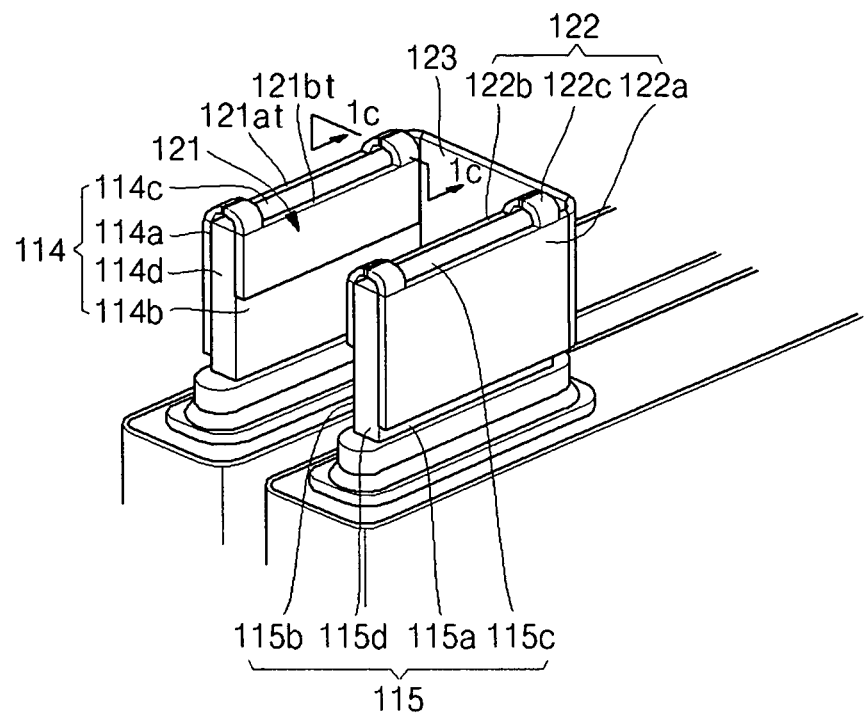
Figure 1C:
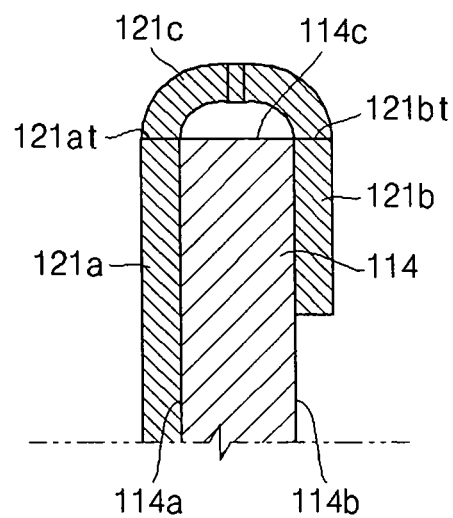
Figure 1D:
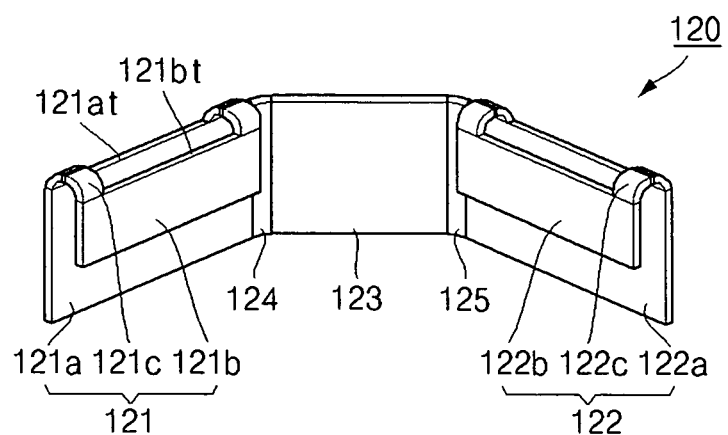
FIG. 1d illustrates an enlarged view of the bus bar of such secondary battery module.

Referring to FIG. 1a, a perspective view of a secondary battery module 100 according to an embodiment is illustrated. Referring to FIG. 1b, a partially enlarged view of the secondary battery module 100 is illustrated. Referring to FIG. 1c, a cross-sectional view taken along line 1c-1c of FIG. 1b is illustrated. Referring to FIG. 1d, an enlarged view of a bus bar of the secondary battery module 100 is illustrated.

As illustrated in FIG. 1a, the secondary battery module 100 may include a plurality of unit batteries 110, each of which may include a first terminal 114 and a second terminal 115. The first terminal 114 and the second terminal 115 may be a positive or negative terminal, depending on the charging/discharging state of the unit battery. The secondary battery module 100 may also include a plurality of bus bars 120 electrically connecting the first terminal 114 of a unit battery 110 to the second terminal 115 of an adjacent unit battery 110.

In the secondary battery module 100, the unit batteries 110 may be spaced apart from each other. Each of the bus bars 120 may electrically connect the first terminal 114 of one of the unit batteries 110 to the second terminal 115 of the adjacent unit battery 110. Due to this construction, the unit batteries 110 may be connected in series.

In addition to the first and second terminals 114 and 115, each of the unit batteries 110 may include an electrode assembly 111, a case 112, a cap assembly 113, and gaskets 116. The unit battery 110 may be, e.g., a prismatic secondary battery having the first and second terminals 114 and 115 as lead tabs.

In the electrode assembly 111, a positive electrode plate and a negative electrode plate may face each other and be separated by a separator. The electrode assembly 111 may be accommodated in an inner space of the case 112.

The case 112 may have an upper opening through which the inner space is exposed to the outside. The case 112 may be made of, e.g., a conductive metal such as aluminum, an aluminum alloy or nickel-plated steel. There is no particular restriction on the shape of the case 112. Preferably, the case 112 is hexahedral. The upper opening of the case 112 may be closed by the cap assembly 113.

The cap assembly 113 may be formed with holes through which the first and second terminals 114 and 115 protrude outwardly. The cap assembly 113 may be coupled to the top of the case 112 to seal the case 112.

The first terminal 114 may have a plate shape. The first terminal 114 may have a first contact surface 114a, a second contact surface 114b, an upper surface 114c and side surfaces 114d. The second terminal 115 may have a plate shape. The second terminal 115 may have a first contact surface 115a, a second contact surface 115b, an upper surface 115c and side surfaces 115d.

The first contact surfaces 114a and 115a may contact the bus bar 120. The second contact surfaces 114b and 115b may be opposite to the first contact surfaces 114a and 115a, respectively, and may also contact the bus bar 120. In the first terminal 114, the upper surface 114c may connect an upper edge of the first contact surface 114a to an upper edge of the second contact surface 114b. The side surfaces 114d may connect sides of the first contact surface 114a to sides of the second contact surface 114b. In the second terminal 115, the upper surface 115c may connect an upper edge of the first contact surface 115a to an upper edge of the second contact surface 115b. The side surfaces 115d may connect sides of the first contact surface 115a to sides of the second contact surface 115b.

The first and second terminals 114 and 115 may be electrically connected to the positive and negative electrode plates of the electrode assembly 111. The first and second terminals 114 and 115 may protrude upwardly through the holes of the cap assembly 113. The upper surfaces 114c and 115c of the first and second terminals 114 and 115 may be coupled to the bus bars 120 by, e.g., welding. The welding may include, e.g., laser or ultrasonic welding.

The gaskets 116 may be made of an insulating material, e.g., a resin. One of the gaskets 116 may be interposed between the first terminal 114 and the cap assembly 113 to electrically isolate the first terminal 114 from the cap assembly 113. The other gasket 116 may be interposed between the second terminal 115 and the cap assembly 113 to electrically isolate the second terminal 115 from the cap assembly 113.

The first and second terminals 114 and 115 of the unit battery 110 may be spaced a predetermined distance apart from each other. When the surface on which the terminals 114 and 115 of the unit battery 110 are formed is defined as the upper surface, a lengthwise direction of the unit battery 110 refers to the direction in which wider side surfaces of the unit battery 110 are arranged in parallel. The unit batteries 110 may be arranged such that the wider side surfaces of the adjacent unit batteries 110 face each other and are spaced at regular intervals.

The unit batteries 110 may be arranged such that the first and second terminals 114 and 115 are alternately arranged at sides of the cap assemblies 113. That is, the first and second terminals 114 and 115 of adjacent unit batteries 110 may be arranged in an alternating manner to form rows of the terminals. The terminal rows may be lines in which terminals with opposite polarities are arranged in a row. The first terminals 114 of the unit batteries 110 may be arranged in such a manner that the first contact surface 114a of the first terminal 114 of one of the unit batteries 110 faces the first contact surface 115a of the second terminal 115 of an adjacent unit battery 110. The second contact surface 114b of the first terminal 114 of the one unit battery 110 may face the second contact surface 115b of the second terminal 115 of another adjacent unit battery 110. The second terminals 115 of the unit batteries 110 may be arranged in such a manner that the first contact surface 115a of the second terminal 115 of one of the unit batteries 110 faces the first contact surface 114a of the first terminal 114 of an adjacent unit battery 110. The second contact surface 115b of the second terminal 115 of the one unit battery 110 may face the second contact surface 114b of the first terminal 114 of another adjacent unit battery 110.

The first terminal 114 of one of the unit batteries 110 may be electrically connected to the second terminal 115 of the adjacent unit battery 110 through the corresponding bus bar 120. The second terminal 115 of the one unit battery 110 may be electrically connected to the first terminal 114 of another adjacent unit battery 110 through the corresponding bus bar 120. In this manner, pairs of the first terminals 114 and the second terminals 115 connected through the bus bars 120 may be alternately arranged, so that the unit batteries 110 may be connected in series to achieve high capacity of the secondary battery module 100.

Each of the bus bars 120 may have a first coupling portion 121, a second coupling portion 122 and a connecting portion 123. The bus bar 120 may further include a first bent portion 124 and a second bent portion 125.

The bus bar 120 may electrically connect the first terminal 114 of one of the unit batteries 110 to the second terminal 115 of an adjacent unit battery 110. That is, the bus bars 120 may connect the unit batteries 110 in series to construct the secondary battery module 100.

The bus bars 120 may include, e.g., copper (Cu) or aluminum (Al), from which the first and second terminals 114 and 115 may also be made. The bus bars 120 may be easily welded to the first and second terminals 114 and 115 of the unit batteries 110 when the same metal is used for the bus bars 120 and the terminals 114 and 115. When different metals are used for the bus bars 120 and the terminals 114 and 115, welding may not be as easy.

The first coupling portion 121 may be in the form of a clip and may be coupled to the first terminal 114 of the unit battery 110. FIGS. 1a through 1c illustrate the first coupling portion 121 coupled to the first terminal 114 of one of the unit batteries 110 and the second coupling portion 122 coupled to the second terminal 115 of the adjacent unit battery 110 to connect the unit batteries 110 in series. Alternatively, the first coupling portion 121 may be coupled to the second terminal 115 of one of the unit batteries 110 and the second coupling portion 122 may be coupled to the first terminal 114 of the adjacent unit battery 110 to connect the unit batteries 110 in series. That is, the first coupling portion 121 may be coupled to any terminal of the unit battery 110 without being limited to the first terminal 114. The first coupling portion 121 may be coupled to terminals having opposite polarities of adjacent unit batteries 110. Due to these connections, the unit batteries 110 may be connected in series.

The first coupling portion 121 may have a first contact portion 121a, a second contact portion 121b and a first fixing portion 121c. The first coupling portion 121 may be in the form of a clip. In the first coupling portion 121, the first fixing portion 121c may be disposed between the first contact portion 121a and the second contact portion 121b. The first fixing portion 121c may be, e.g., arch-shaped. The first and second contact portion 121a and 121b may be, e.g., plate-shaped. The first fixing portion 121c may be formed of, e.g., an elastic material. Due to the elasticity of the first fixing portion 121c, the distance between the first and second contact portions 121a and 121b may be controlled in directions extending along a periphery of the first fixing portion 121c.

The first contact portion 121a may be, e.g., plate-shaped, and may contact the first contact surface 114a of the first terminal 114 to allow an inner side surface of the first contact portion 121a to completely cover the first contact surface 114a of the first terminal 114. The first contact portion 121a may be electrically and mechanically connected to the second contact portion 121b through the first fixing portion 121c. The first contact portion 121a may be pressed to the first contact surface 114a of the first terminal 114 due to the elasticity of the first fixing portion 121c. An upper surface 121 at of the first contact portion 121a may be connected to the first fixing portion 121c and may be in the same plane as the upper surface 114c of the first terminal 114. With this configuration, the upper surface 121 at of the first contact portion 121a may be coupled to the upper surface 114c of the first terminal 114 by, e.g., welding. For example, the upper surface 121 at of the first contact portion 121a may be coupled to an edge of the upper surface 114c of the first terminal 114 by welding. The welding may include, e.g., laser or ultrasonic welding. Laser or ultrasonic welding may enable precise welding of the first contact portion 121a and the first terminal 114 in a downward direction. Since there may be no need to bring an additional instrument such as a probe into contact with the terminals during laser or ultrasonic welding, the distance between the unit batteries 110 may not affect the welding process. Therefore, laser or ultrasonic welding may be advantageous in terms of workability, and may prevent short circuits between the first and second terminals 114 and 115 of the unit batteries 110.

An increase in contact area between the first contact portion 121a and the first contact surface 114a of the first terminal 114 may mean an increase in contact area between the first terminal 114 and the first coupling portion 121. A larger contact area between the first contact portion 121a and the first terminal 114 may desirably lead to a higher current collection efficiency and a lower contact resistance between the first terminal 114 and the bus bar 120.

The second contact portion 121b may be, e.g., plate-shaped, and may contact the second contact surface 114b of the first terminal 114 to allow an inner side surface of the second contact portion 121b to completely cover the second contact surface 114b of the first terminal 114. The second contact portion 121b may be pressed to the second contact surface 114b of the first terminal 114 due to the elasticity of the first fixing portion 121c. The upper surface 121bt of the second contact portion 121b may be connected to the first fixing portion 121c and may be in the same plane as the upper surface 114c of the first terminal 114.

With this configuration, the upper surface 121bt of the second contact portion 121b may be joined to the upper surface 114c of the first terminal 114 by, e.g., welding. For example, the upper surface 121bt of the second contact portion 121b may be joined to an edge of the upper surface 114c of the first terminal 114 by welding. The welding may include, e.g., laser or ultrasonic welding. Laser or ultrasonic welding may enable precise welding of the second contact portion 121b and the first terminal 114 in the downward direction. Since there may be no need to bring an additional instrument such as a probe into contact with the terminals during laser or ultrasonic welding, the distance between the unit batteries 110 may not affect the welding process. Therefore, the laser or ultrasonic welding may be advantageous in terms of workability and may prevent short circuits between the first and second terminals 114 and 115 of the unit batteries 110.

Although FIGS. 1a through 1d illustrate that the height of the second contact portion 121b is smaller than that of the first contact portion 121a, it is to be understood that the height of the second contact portion 121b may be equal to or greater than that of the first contact portion 121a. The heights of the first and second contact portions 121a and 121b refer to the lengths thereof in a direction corresponding to an axial direction of the first and second terminals 114 and 115.

An increase in contact area between the second contact portion 121b and the second contact surface 114b of the first terminal 114 may mean an increase in contact area between the first terminal 114 and the first coupling portion 121. A larger contact area between the second contact portion 121b and the first terminal 114 may lead to a higher current collection efficiency and a lower contact resistance. Therefore, an increase in the height of the second contact portion 121b may contribute to an increase in current collection efficiency and a reduction in contact resistance between the first terminal 114 and the bus bar 120.

The first fixing portion 121c may mechanically and electrically connect the first contact portion 121a to the second contact portion 121b. The first fixing portion 121c may be coupled to the upper surface 114c of the first terminal 114 of the unit battery 110. The first fixing portion 121c may connect sides of the upper surface of the first contact portion 121a to sides of the upper surface of the second contact portion 121b. The first fixing portion 121c may allow a central portion of the upper surface 114c of the first terminal 114 to be exposed. The exposed portion of the upper surface 114c of the first terminal 114 may be coupled to at least one of the first and second contact portions 121a and 121b by, e.g., welding. That is, the exposed portion of the upper surface 114c of the first terminal 114 may be welded to the first contact portion 121a, the second contact portion 121b or both contact portions. The welding may include, e.g., laser or ultrasonic welding.

The first fixing portion 121c may be, e.g., arch-shaped and elastic. The first fixing portion 121c may apply pressure between the first and second contact portions 121a and 121b to fix the first and second contact portions 121a and 121b to the first terminal 114 of the unit battery 110. For better elasticity, the first fixing portion 121c may be, e.g., corrugated or bent. Due to the elasticity of the first fixing portion 121c, the distance between the first and second contact portions 121a and 121b may be controlled in directions extending along the periphery of the first fixing portion 121c.

The elasticity of the first fixing portion 121c may allow the first coupling portion 121 to be fitted on the first terminal 114 prior to welding. When the first coupling portion 121 is fitted on the first terminal 114, the first fixing portion 121c may serve as a stopper, making it easy to precisely control the height of the first coupling portion 121 with respect to the first terminal 114. That is, when the first coupling portion 121 is coupled to the first terminal 114, the upper surface 114c of the first terminal 114, the upper surface 121at of the first contact portion 121a and the upper surface 121bt of the second contact portion 121b may be aligned to have the same height by the first fixing portion 121c.

The second coupling portion 122 may be a clip coupled to the second terminal 115. The second coupling portion 122 may have a third contact portion 122a, a fourth contact portion 122b and a second fixing portion 122c. In the second coupling portion 122, the second fixing portion 122c may be interposed between the third contact portion 122a and the fourth contact portion 122b. The second fixing portion 122c may be, e.g., arch-shaped. The third and fourth contact portion 122a and 122b may be, e.g., plate-shaped. The second fixing portion 122c may include, e.g., an elastic material. Due to the elasticity of the second fixing portion 122c, the distance between the third and fourth contact portions 122a and 122b may be controlled. The fourth contact portion 122b of the second coupling portion 122 and the second contact portion 121b of the first coupling portion 121 may be arranged to face each other in the secondary battery module 100 of an embodiment.

The second coupling portion 122 may have the same structure as the first coupling portion 121. The coupling arrangement between the second coupling portion 122 and the second terminal 115 may be the same as the coupling arrangement between the first coupling portion 121 and the first terminal 114. Thus, a repeated explanation of the second coupling portion 122 is omitted.

The connecting portion 123 may have, e.g., a plate shape, and may connect an end of the first contact portion 121a of the first coupling portion 121 and an end of the third contact portion 122a of the second coupling portion 122. This connection may allow the bus bar 120 to have a "U" configuration. The first bent portion 124 may be disposed between the connecting portion 123 and the first coupling portion 121. The first bent portion 124 may facilitate a connection between the connecting portion 123 and the first coupling portion 121 at a corner of the bus bar 120. The second bent portion 125 may be disposed between the connecting portion 123 and the second coupling portion 122. The second bent portion 125 may facilitate a connection between the connecting portion 123 and the second coupling portion 122 at a corner of the bus bar 120.

The connecting portion 123 may be connected to the first contact portion 121a of the first coupling portion 121 and the third contact portion 122a of the second coupling portion 122. The connecting portion 123, the first contact portion 121a and the third contact portion 122a may have the same height. The heights of the connecting portion 123 and the first and third contact portions 121a and 122a refer to the lengths thereof in a direction corresponding to the axial direction of the first and second terminals 114 and 115.

The connecting portion 123 may also connect between another end of the first contact portion 121a of the first coupling portion 121 and another end of the third contact portion 122a of the second coupling portion 122, opposite to each other. Alternatively, the connecting portion 123 may connect an end of the second contact portion 121b of the first coupling portion 121 and an end of the fourth contact portion 122b of the second coupling portion 122, opposite to each other. That is, the connecting portion 123 may be connected to the first contact portion 121a of the first coupling portion 121 and the third contact portion 122a of the second coupling portion 122 or to the second contact portion 121b of the first coupling portion 121 and the fourth contact portion 122b of the second coupling portion 122, so that the bus bar 120 may have a "U" configuration.

The first bent portion 124 may include, e.g., an elastic material. Accordingly, the first bent portion 124 may be easily bendable between the first coupling portion 121 and the connecting portion 123.

The second bent portion 125 may also include, e.g., an elastic material. Accordingly, the second bent portion 125 may also be easily bendable between the second coupling portion 122 and the connecting portion 123.

In the secondary battery module 100, the first and second terminals 114 and 115 of the unit batteries 110 may be precisely welded by, e.g., laser or ultrasonic welding, to the bus bars 120 on upper surfaces thereof, which may lie in the same plane as the bus bars 120. This welding may prevent short circuits between the first and second terminals 114 and 115 of adjacent unit batteries 110 without being affected by the distance between the unit batteries 110.

In addition, the bus bars 120 may be temporarily fitted on the first and second terminals 114 and 115 of the unit batteries 110 through the clip-type first and second coupling portions 121 and 122 prior to welding. Furthermore, the height of the bus bars 120 may be easily controlled and maintained before welding of the bus bars 120 to the first and second terminals 114 and 115 in order to arrange the welded portions in the same plane.

Figure 2A:
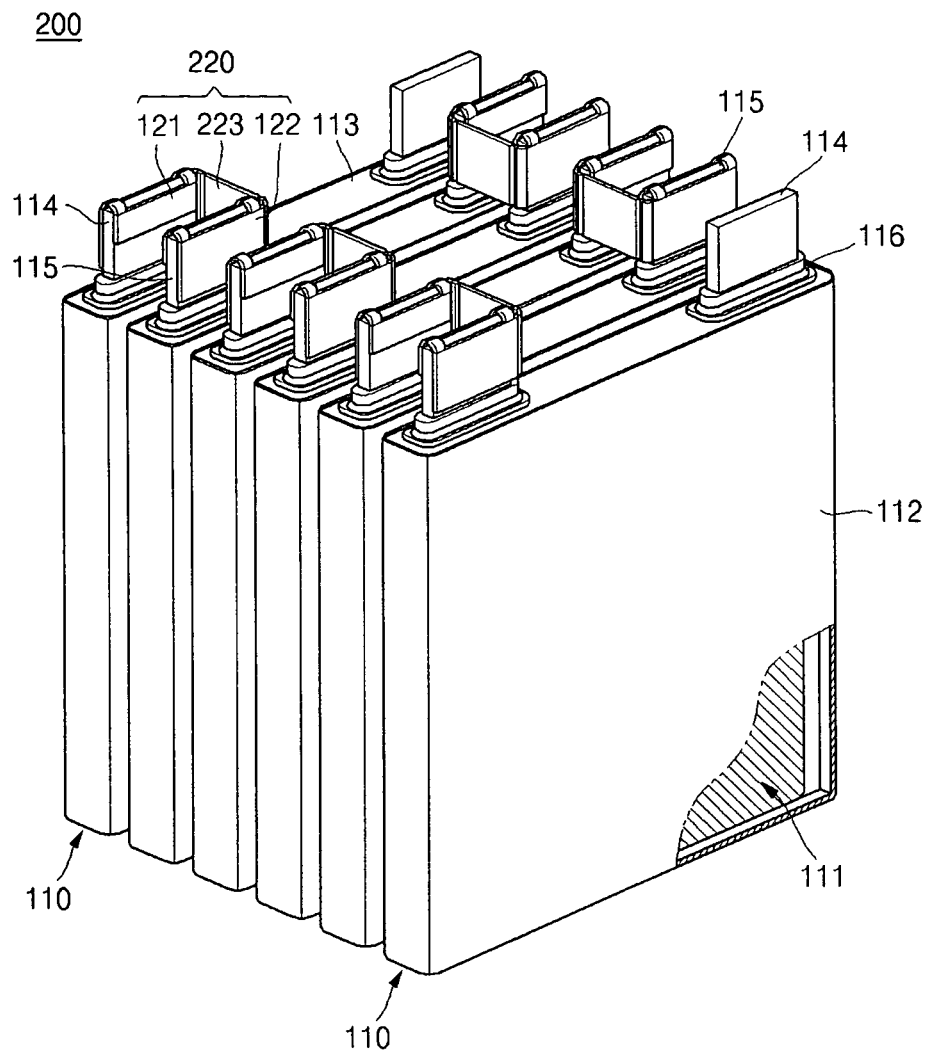
FIG. 2a illustrates a perspective view of a secondary battery module according to another embodiment.
Figure 2B:
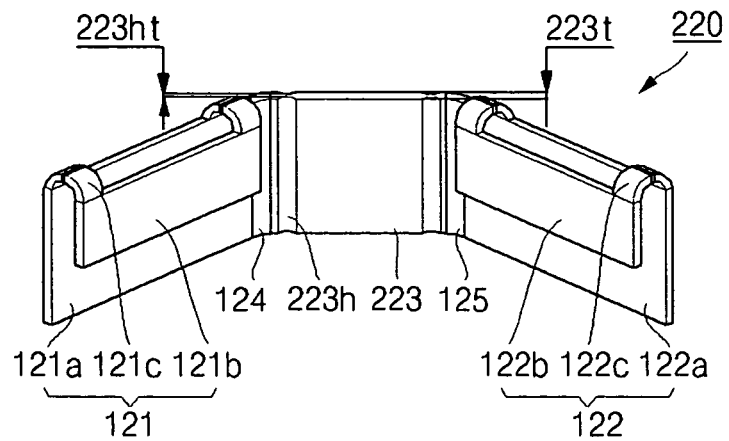
FIG. 2b illustrates an enlarged view of the bus bar of such secondary battery module.

Referring to FIG. 2a, a perspective view of a secondary battery module 200 according to another embodiment is illustrated. Referring to FIG. 2b, an enlarged view of the secondary battery module 200 is illustrated.

As illustrated in FIGS. 2a and 2b, the secondary battery module 200 may include unit batteries 110 and bus bars 220. Each of the bus bars 220 may have a first coupling portion 121, a second coupling portion 122, a connecting portion 223, a first bent portion 124 and a second bent portion 125.

The unit batteries 110 of the secondary battery module 200 may be the same as the unit batteries 110 of the secondary battery module 100 illustrated in FIGS. 1a and 1b. The first and second coupling portions 121 and 122 and the first and second bent portions 124 and 125 of the bus bars 220 may be the same as those of the bus bars 120 illustrated in FIGS. 1a through 1d in terms of their structures. Thus, detailed explanations of the connecting portions 223 of the bus bars 220 different from those of the secondary battery module 100 will be provided below.

The connecting portion 223 may be, e.g., plate-shaped, and may connect an end of the first contact portion 121a of the first coupling portion 121 and an opposing end of the third contact portion 122a of the second coupling portion 122. This connection allows the bus bar 220 to have a "U" configuration.

The connecting portion 223 may include grooves 223h adjacent to the first coupling portion 121 and the second coupling portion 122. The grooves 223h may be substantially parallel to a connecting surface between the connecting portion 223 and the first coupling portion 121. That is, the grooves 223h may be disposed on inner and outer surfaces of both ends of the connecting portion 223. Hence, a thicknesses 223ht of both ends of the connecting portion 223 may be smaller than a thickness 223t of a central portion of the connecting portion 223.

The connecting portion 223 may enable the bus bar 220 to be properly coupled to the terminals 114 and 115 of adjacent unit batteries 110 despite different distances between unit batteries 110. The length of the connecting portion 223, which corresponds to the distance between the first and second coupling portions 121 and 122, may vary due to the grooves 223h. That is, the connecting portion 223 may be easily bendable at ends thereof because the thickness 223t of the central portion of the connecting portion 223 may be larger than the thicknesses 223ht of sides of the connecting portion 223. With these dimensions, the bus bars 220 may have a buffering effect against different distances between the unit batteries 110.

The connecting portion 223 may also connect another end of the first contact portion 121a of the first coupling portion 121 and the opposing end of the third contact portion 122a of the second coupling portion 122. Alternatively, the connecting portion 223 may connect between one end of the second contact portion 121b of the first coupling portion 121 and the opposing end of the fourth contact portion 122b of the second coupling portion 122. That is, the connecting portion 223 may be connected to the first contact portion 121a of the first coupling portion 121 and the third contact portion 122a of the second coupling portion 122 or to the second contact portion 121b of the first coupling portion 121 and the fourth contact portion 122b of the second coupling portion 122, so that the bus bar 220 may have a "U" configuration.

The connecting portion 223 may be connected to the first contact portion 121a of the first coupling portion 121 and the third contact portion 122a of the second coupling portion 122. The connecting portion 223, the first contact portion 121a and the third contact portion 122a may have the same height. The heights of the connecting portion 223 and the first and third contact portions 121a and 122a refer to the lengths thereof in a direction corresponding to the axial direction of the first and second terminals 114 and 115 of the unit battery 110.

In the secondary battery module 200 of the present embodiment, the first and second terminals 114 and 115 of the unit batteries 110 may be precisely welded to the bus bars 220 on the upper surfaces thereof, which upper surfaces lie in the same plane as the bus bars 220, by, e.g., laser or ultrasonic welding. This welding may prevent short circuits between the first and second terminals 114 and 115 of the adjacent unit batteries 110 without being affected by different distances between unit batteries 110.

In addition, the bus bars 220 may be temporarily fitted on the first and second terminals 114 and 115 of the unit batteries 110 through the clip-type first and second coupling portions 121 and 122 prior to welding. Furthermore, the height of the bus bars 220 may be easily controlled and maintained before welding of the bus bars 220 to the first and second terminals 114 and 115 in order for the welded portions to lie in the same plane. Moreover, since the thickness of the central portion of the connecting portion 223 may be larger than the thicknesses of sides of the connecting portion 223, the secondary battery module 200 may have a buffering effect against different distances between the unit batteries 110.

Figure 3A:
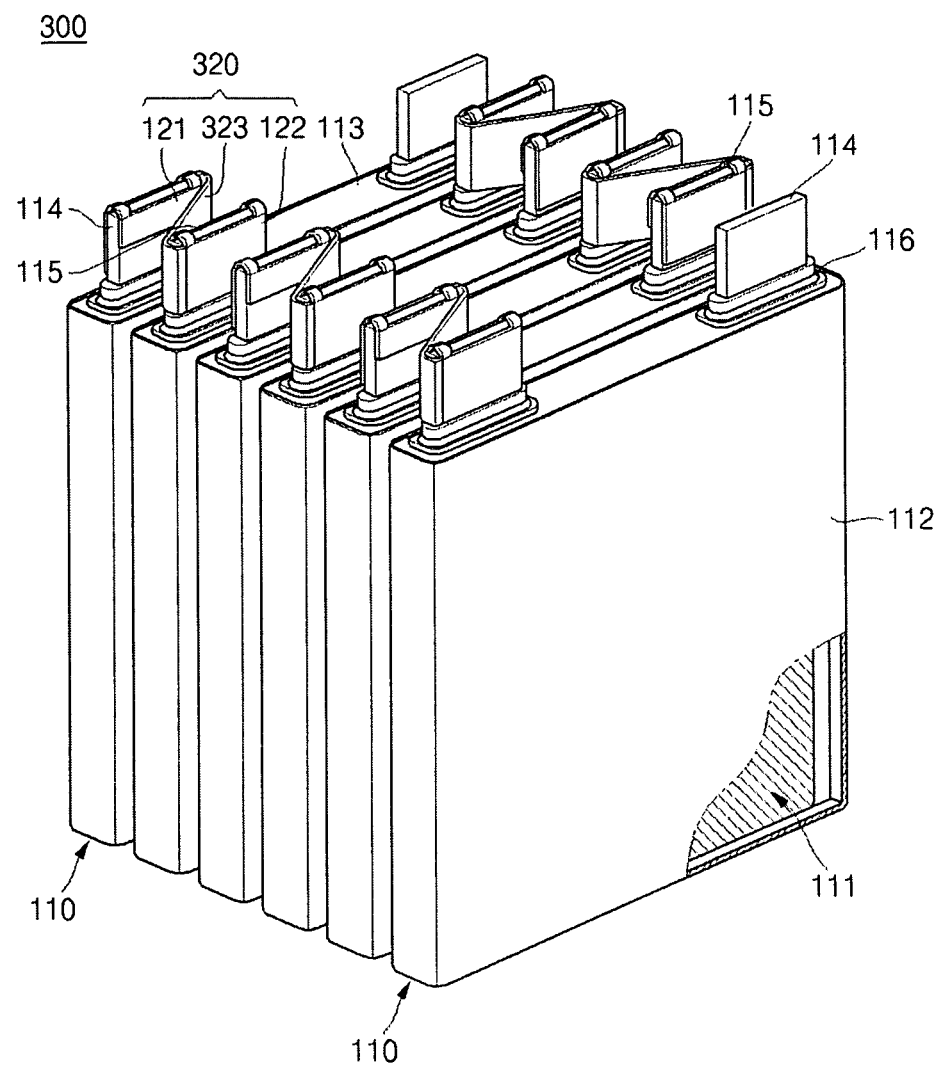
FIGS. 3a and 3b respectively illustrate a perspective view and a partially enlarged view of a secondary battery module according to yet another embodiment.
Figure 3B:
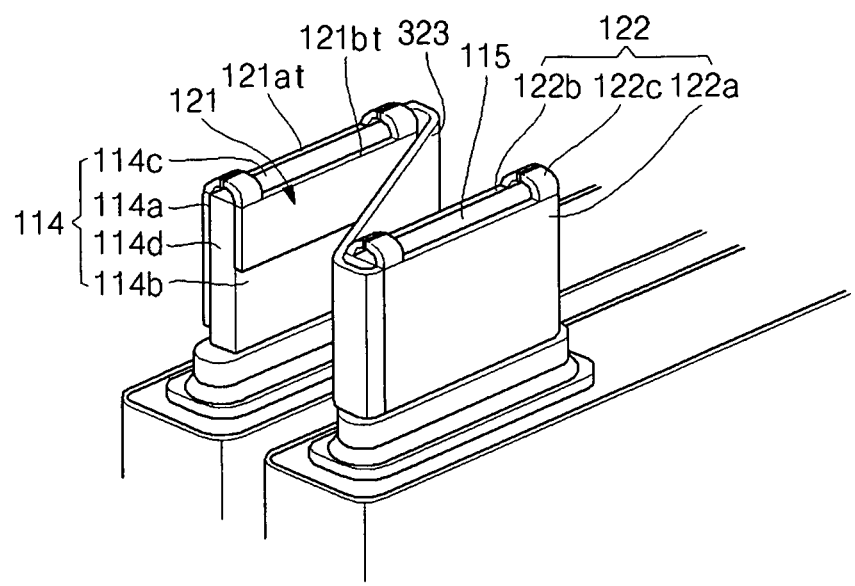
Figure 3C:
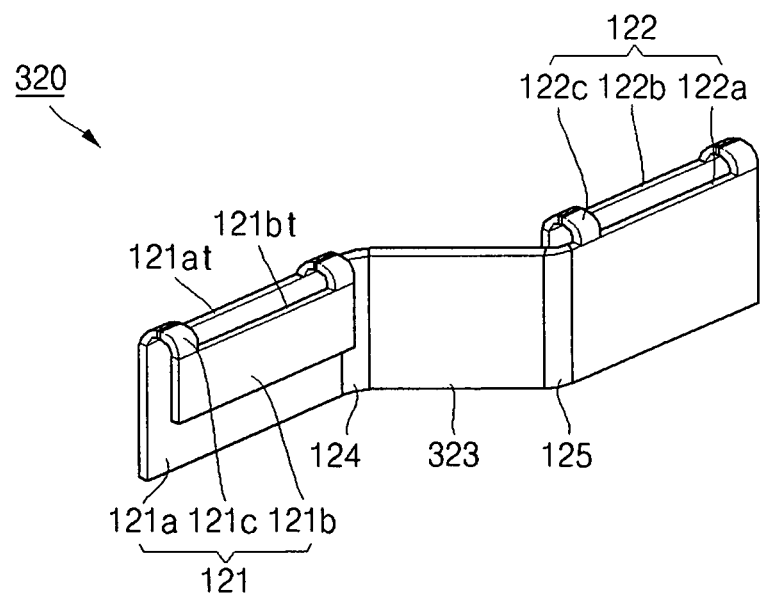
FIG. 3c illustrates an enlarged view of the bus bar of such secondary battery module.

Referring to FIG. 3a, a perspective view of a secondary battery module 300 according to yet another embodiment is illustrated. Referring to FIG. 3b, a partially enlarged view of the secondary battery module 300 is illustrated. Referring to FIG. 3c, an enlarged view of a bus bar of the secondary battery module 300 is illustrated. As illustrated in FIGS. 3a through 3c, the secondary battery module 300 may include unit batteries 110 and bus bars 320. Each of the bus bars 320 may have a first coupling portion 121, a second coupling portion 122, a connecting portion 323, a first bent portion 124 and a second bent portion 125.

The unit batteries 110 of the secondary battery module 300 of the present embodiment may be the same as the unit batteries 110 of the secondary battery module 100 illustrated in FIGS. 1a and 1b. The first and second coupling portions 121 and 122 and the first and second bent portions 124 and 125 of the bus bars 220 may be the same as those of the bus bars 120 illustrated in FIGS. 1a through 1d in terms of their structures. Thus, only detailed explanations of the connecting portions 323 of the bus bars 320 different from those of the secondary battery module 100 will be provided below.

The connecting portion 323 may be, e.g., plate-shaped, and may connect an end of the first contact portion 121a of the first coupling portion 121 and a diagonally opposing end of the third contact portion 122a of the second coupling portion 122. This connection may allow the bus bar 320 to have a zigzag, or a "Z," configuration. Alternatively, the connecting portion 323 may connect the other end of the first contact portion 121a of the first coupling portion 121 and the other diagonally opposing end of the third contact portion 122a of the second coupling portion 122. That is, the connecting portion 323 may be connected to the first contact portion 121a of the first coupling portion 121 and the third contact portion 122a of the second coupling portion 122, so that the bus bar 320 can have a zigzag, or a "Z," configuration.

The zigzag shape of the bus bar 320 may efficiently enable the bus bar 320 to be properly coupled to the terminals of adjacent unit batteries 110 despite different distances between the unit batteries 110. This is in contrast to the "U" configuration of the bus bar in which the connecting portion is vertically coupled to the first and second coupling portions. That is, since the length of the connecting portion 323, which corresponds to the diagonal distance between the first and second coupling portions 121 and 122, is easily variable, the bus bars 320 may have a buffering effect against different distances between the unit batteries 110.

The connecting portion 323 may be connected to the first contact portion 121a of the first coupling portion 121 and the third contact portion 122a of the second coupling portion 122. The connecting portion 223, the first contact portion 121a and the third contact portion 122a may have the same height. The heights of the connecting portion 323 and the first and third contact portions 121a and 122a refer to the lengths thereof in a direction corresponding to the axial direction of the first and second terminals 114 and 115 of the unit batteries 110.

Ends of the connecting portion 323 may be thinner than a central portion thereof, as in the connecting portion 223 of the bus bar 220 illustrated in FIGS. 2a and 2b. This thickness difference may enable the bus bar 320 to be properly coupled to the terminals 114 and 115 of adjacent unit batteries 110 despite different distances between the unit batteries 110. That is, the bus bars 320 may have a buffering effect against different distances between the unit batteries 110.

In the secondary battery module 300 of the present embodiment, the first and second terminals 114 and 115 of the unit batteries 110 may be precisely welded to the bus bars 320 on the upper surfaces thereof, which lie in the same plane as the bus bars 320, by, e.g., laser or ultrasonic welding. This welding may prevent short circuits between the first and second terminals 114 and 115 of the adjacent unit batteries 110 without being affected by the distance between the unit batteries 110.

In addition, the bus bars 320 may be temporarily fitted on the first and second terminals 114 and 115 of the unit batteries 110 through the clip-type first and second coupling portions 121 and 122 prior to welding. Furthermore, the height of the bus bars 320 may be easily controlled and maintained before welding of the bus bars 320 to the first and second terminals 114 and 115 in order for the welded portions to lie in the same plane. Moreover, since the bus bars 320 may have a zigzag configuration, and the connecting portions 323 may have a larger thickness in the central portions thereof than at ends thereof, the secondary battery module 300 may have a buffering effect against different distances between the unit batteries 110.

Figure 4A:
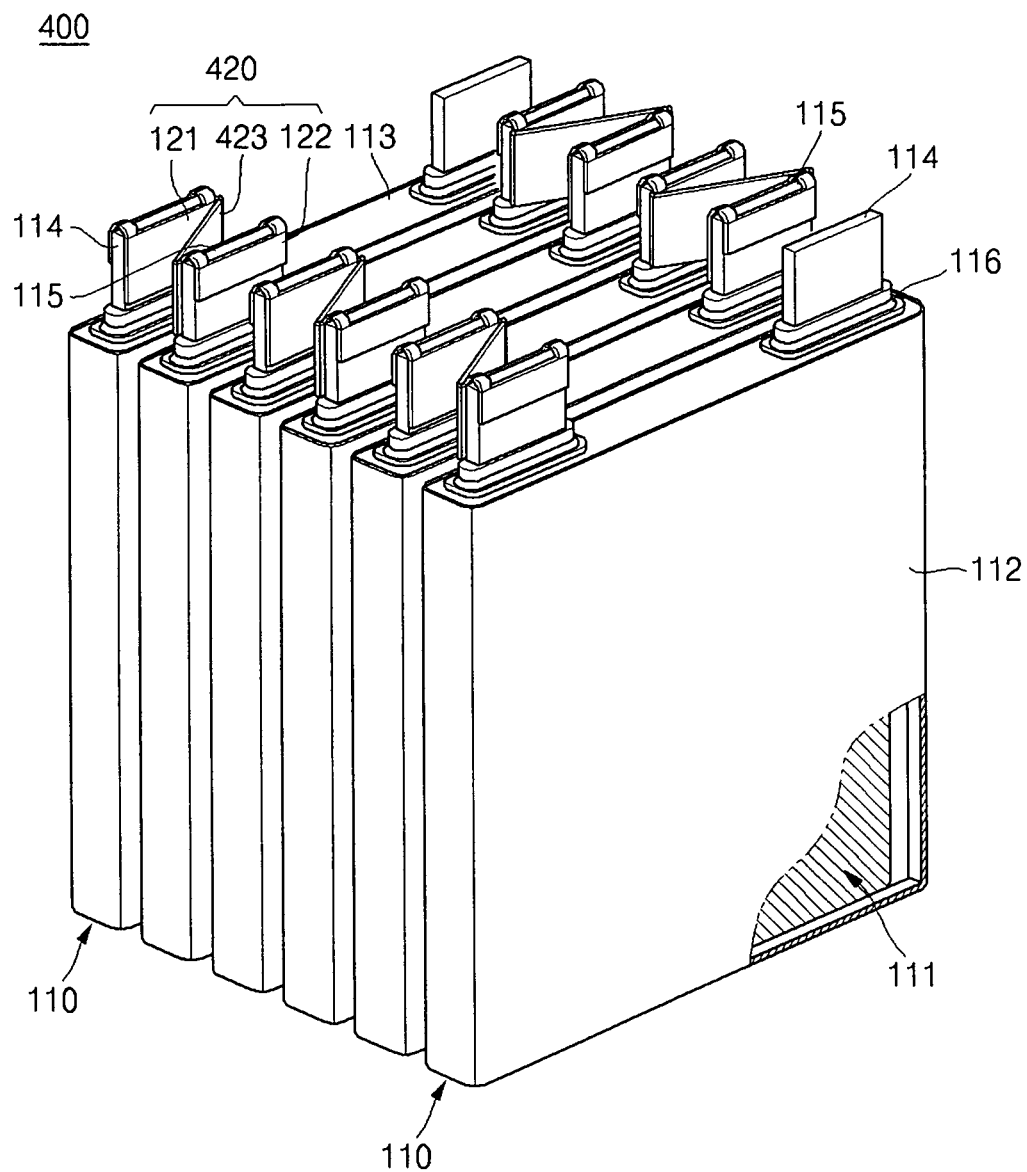
FIGS. 4a and 4b respectively illustrate a perspective view and a partially enlarged view of a secondary battery module according to still another embodiment.
Figure 4B:
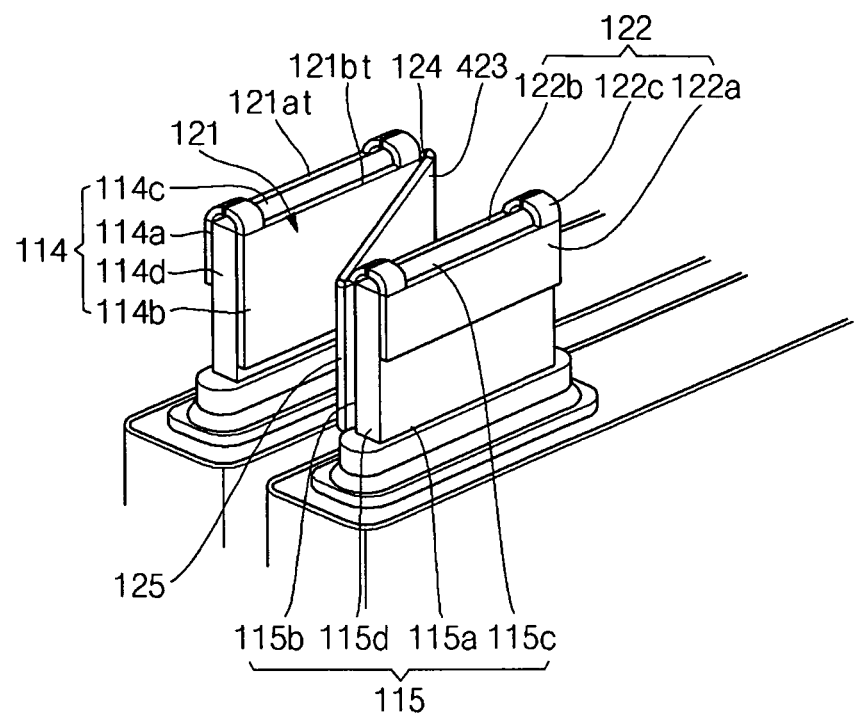

Referring to FIG. 4a, a perspective view of a secondary battery module 400 according to still another embodiment is illustrated. Referring to FIG. 4b, a partially enlarged view of the secondary battery module 400 is illustrated.

As illustrated in FIGS. 4a and 4b, the secondary battery module 400 of the present embodiment may include unit batteries 110 and bus bars 420. Each of the bus bars 420 may have a first coupling portion 121, a second coupling portion 122, a connecting portion 423, a first bent portion 124 and a second bent portion 125.

The unit batteries 110 of the secondary battery module 400 of the present embodiment may be the same as the unit batteries 110 of the secondary battery module 100 illustrated in FIGS. 1a and 1b. The first and second coupling portions 121 and 122 and the first and second bent portions 124 and 125 of the bus bars 420 may be the same as those of the bus bars 120 illustrated in FIGS. 1a through 1d in terms of their structures. Thus, only detailed explanations of the connecting portions 423 of the bus bars 420 different from those of the secondary battery module 100 will be provided below.

The connecting portion 423 may be, e.g., plate-shaped, and may connect one end of the second contact portion 121b of the first coupling portion 121 and a diagonally opposed end of the fourth contact portion 122b of the second coupling portion 122. This connection may allow the bus bar 420 to have a zigzag, or a "Z," configuration. The first bent portion 124 may be disposed between the connecting portion 423 and the first coupling portion 121. The first bent portion 124 may facilitate the connection between the connecting portion 423 and the first coupling portion 121 at the corner of the bus bar 420. The second bent portion 125 may be disposed between the connecting portion 423 and the second coupling portion 122. The second bent portion 125 may facilitate the connection between the connecting portion 423 and the second coupling portion 122 at the corner of the bus bar 420.

The connecting portion 423 may connect the other end of the second contact portion 121b of the first coupling portion 121 and the diagonally opposed other end of the fourth contact portion 122b of the second coupling portion 122. That is, the connecting portion 423 may be connected to the second contact portion 121b of the first coupling portion 121 and the fourth contact portion 122b of the second coupling portion 122, so that the bus bar 420 may have a zigzag configuration.

The zigzag configuration of the bus bar 420 may enable the bus bar 420 to be properly coupled to the terminals of adjacent unit batteries 110 despite different distances between the unit batteries 110. This is in contrast to the "U" configuration of the bus bar in which the connecting portion is vertically coupled to the first and second coupling portions. That is, since a length of the connecting portion 423, which corresponds to a diagonal distance between the first and second coupling portions 121 and 122, is easily variable, the bus bars 420 may have a buffering effect against different distances between the unit batteries 110.

The connecting portion 423 may be connected to the second contact portion 121b of the first coupling portion 121 and the fourth contact portion 122b of the second coupling portion 122. The connecting portion 423, the first contact portion 121a and the third contact portion 122a may have the same height. The heights of the connecting portion 423 and the second contact portions 121b and 122b refer to the lengths thereof in a direction corresponding to the axial direction of the first and second terminals 114 and 115 of the unit batteries 110.

Ends of the connecting portion 423 may be thinner than the central portion thereof, as in the connecting portion 223 of the bus bar 220 illustrated in FIGS. 2a and 2b. This thickness difference may prevent the bus bar 420 from being improperly coupled to the terminals 114 and 115 of the adjacent unit batteries 110 despite different distances between the unit batteries 110. That is, the bus bars 420 may have a buffering effect against different distances between the unit batteries 110.

In the secondary battery module 400 of the present embodiment, the first and second terminals 114 and 115 of the unit batteries 110 may be precisely welded by, e.g., laser or ultrasonic welding, to the bus bars 420 on the upper surfaces thereof, which upper surfaces lie in the same plane as the bus bars 420. This welding may prevent short circuits between the first and second terminals 114 and 115 of adjacent unit batteries 110 without being affected by the distance between the unit batteries 110.

In addition, the bus bars 420 may be temporarily fitted on the first and second terminals 114 and 115 of the unit batteries 110 through the clip-type first and second coupling portions 121 and 122 prior to welding. Furthermore, the height of the bus bars 420 may be easily controlled and maintained before welding of the bus bars 420 to the first and second terminals 114 and 115 in order for the welded portions to lie in the same plane. Moreover, since the bus bars 420 may have a zigzag configuration and the connecting portions 423 may have a larger thickness in the central portions thereof than at ends thereof, the secondary battery module 400 may have a buffering effect against different distances between the unit batteries 110.

Figure 5A:
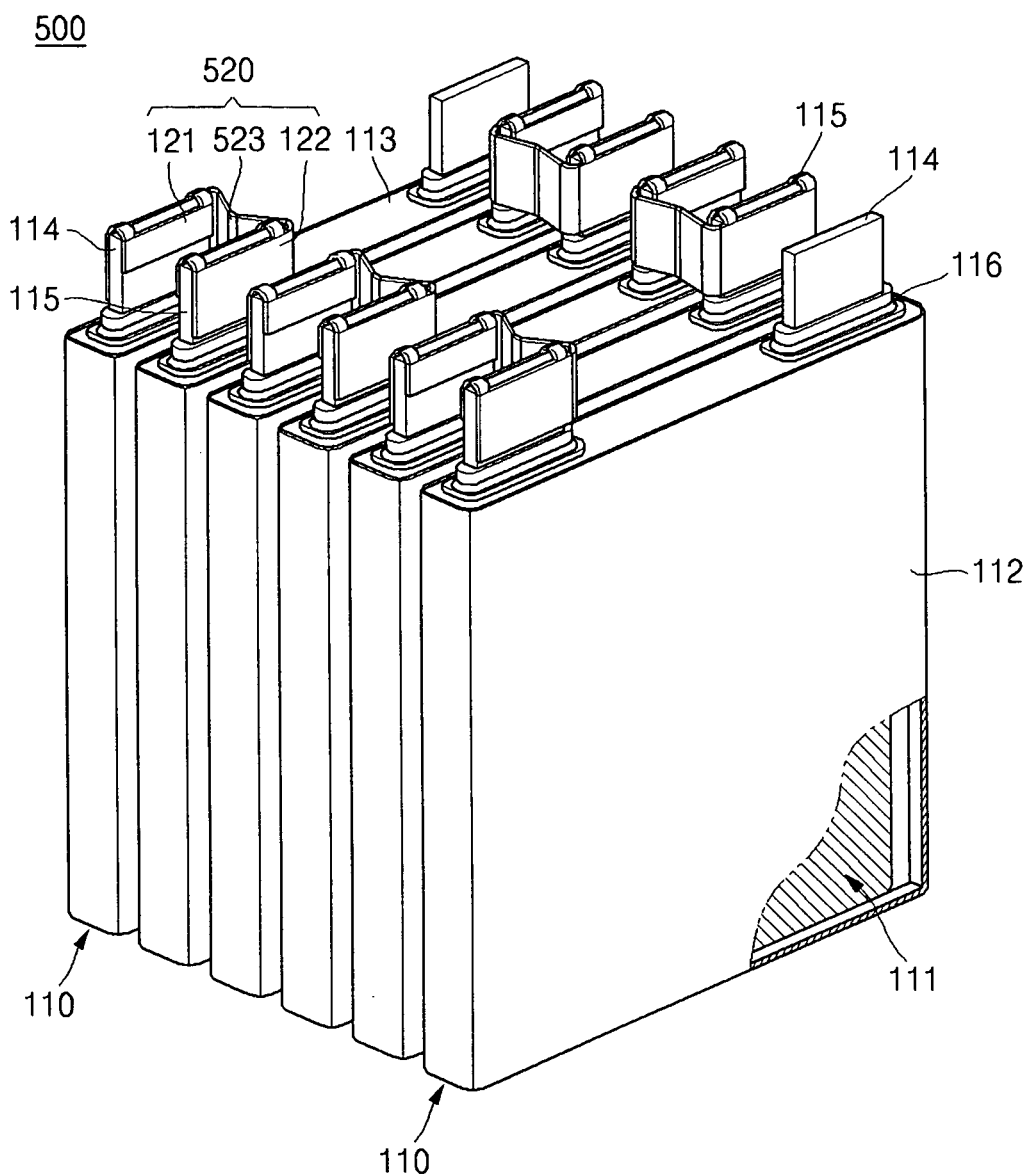
FIGS. 5a and 5b respectively illustrate a perspective view and a partially enlarged view of a secondary battery module according to still another embodiment.
Figure 5B:
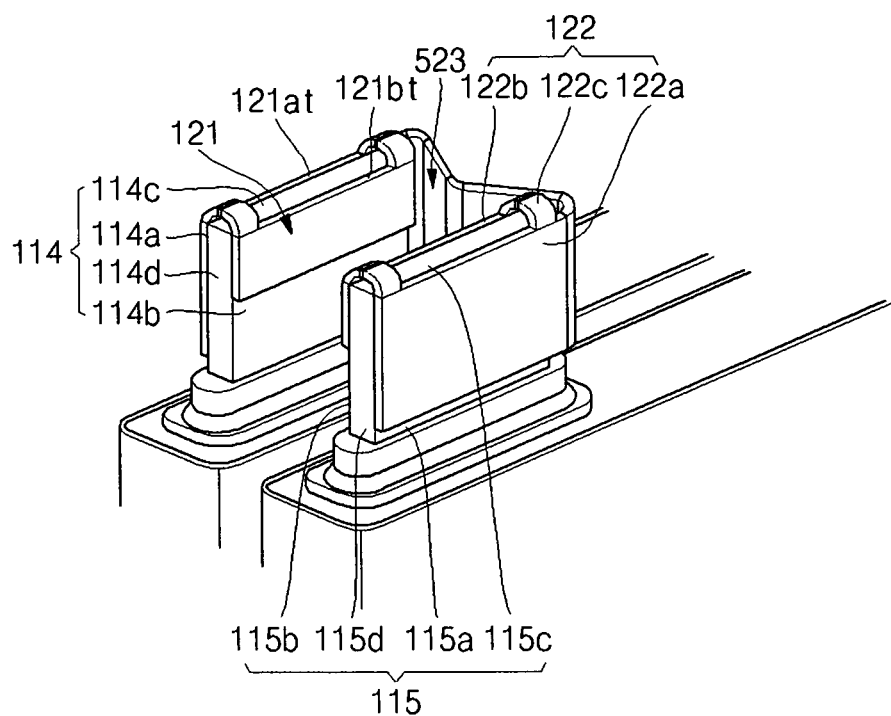
Figure 5C:
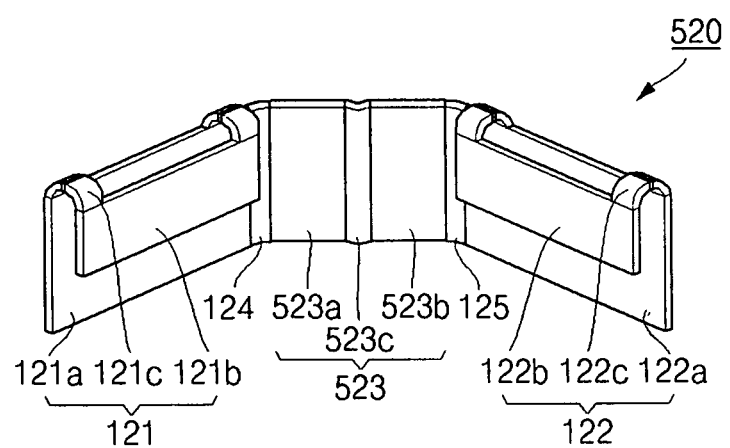
FIG. 5c illustrates an enlarged view of the bus bar of such secondary battery module.

Referring to FIG. 5a, a perspective view of a secondary battery module 500 according to still another embodiment is illustrated. Referring to FIG. 5b, a partially enlarged view of the secondary battery module 500 is illustrated. Referring to FIG. 5c, an enlarged view of a bus bar of the secondary battery module 500 is illustrated.

As illustrated in FIGS. 5a through 5c, the secondary battery module 500 may include unit batteries 110 and bus bars 420. Each of the bus bars 520 may have a first coupling portion 121, a second coupling portion 122, a connecting portion 523, a first bent portion 124 and a second bent portion 125.

The unit batteries 110 of the secondary battery module 500 of the present embodiment may be the same as the unit batteries 110 of the secondary battery module 100 illustrated in FIGS. 1a and 1b. The first and second coupling portions 121 and 122 and the first and second bent portions 124 and 125 of the bus bars 520 may be the same as those of the bus bars 120 illustrated in FIGS. 1a through 1d in terms of their structures. Thus, only detailed explanations of the connecting portions 523 of the bus bars 520 different from those of the secondary battery module 100 will be provided below.

The connecting portion 523 may have, e.g., a plate shape, and may connect an end of the first contact portion 121a of the first coupling portion 121 and an opposing end of the third contact portion 122a of the second coupling portion 122. This connection allows the bus bar 520 to have a "U" configuration.

The connecting portion 523 may include a first connecting portion 523a, a second connecting portion 523b and a third connecting portion 523c. The first connecting portion 523a may have, e.g., a flat plate shape, and may be disposed between and connect the first coupling portion 121 and the third connecting portion 523c. The second connecting portion 523b may also have, e.g., a flat plate shape, and may be disposed between and connect the second coupling portion 122 and the third connecting portion 523c. The third connecting portion 523c may have at least one bent portion and may be disposed between and connect the first and second connecting portions 523a and 523b.

The third connecting portion 523c between the first and second connecting portions 523a and 523b may enable the bus bar 520 to be properly coupled to the terminals of adjacent unit batteries 110 despite different distances between the unit batteries 110. The length of the connecting portion 523, which corresponds to the distance between the first and second coupling portions 121 and 122, may vary due to the bent connecting portion 523c. That is, the bus bars 520 may have a buffering effect against different distances between the unit batteries 110.

The connecting portion 523 may be connected to the first contact portion 121a of the first coupling portion 121 and the third contact portion 122a of the second coupling portion 122. The connecting portion 523, the first contact portion 121a and the third contact portion 122a may have the same height. The heights of the connecting portion 523 and the first contact portions 121a and 122a refer to the lengths thereof in a direction corresponding to the axial direction of the first and second terminals 114 and 115 of the unit batteries 110.

Ends of the connecting portions 523 may be thinner than the central portion thereof, as in the connecting portion 223 of the bus bar 220 illustrated in FIGS. 2a and 2b. This thickness difference may prevent the bus bar 520 from being improperly coupled to the terminals 114 and 115 of the adjacent unit batteries 110 despite different distances between the unit batteries 110 of the secondary battery module 500. That is, the bus bars 520 may have a buffering effect against different distances between the unit batteries 110.

In the secondary battery module 500 of the present embodiment, the first and second terminals 114 and 115 of the unit batteries 110 may be precisely welded by, e.g., laser or ultrasonic welding, to the bus bars 520 on the upper surfaces thereof, which upper surfaces lie in the same plane as the bus bars 520. This welding may prevent short circuits between the first and second terminals 114 and 115 of the adjacent unit batteries 110 without being affected by the distance between the unit batteries 110.

In addition, the bus bars 520 may be temporarily fitted on the first and second terminals 114 and 115 of the unit batteries 110 through the clip-type first and second coupling portions 121 and 122 prior to welding. Furthermore, the height of the bus bars 520 may be easily controlled and maintained before welding of the bus bars 520 to the first and second terminals 114 and 115 in order for the welded portions to lie in the same plane. Moreover, since the connecting portions 523, any of which may have the bent connecting portion 523c, may have a larger thickness in the central portions thereof than at ends thereof, the secondary battery module 500 may have a buffering effect against different distances between the unit batteries 110.

Figure 6A:
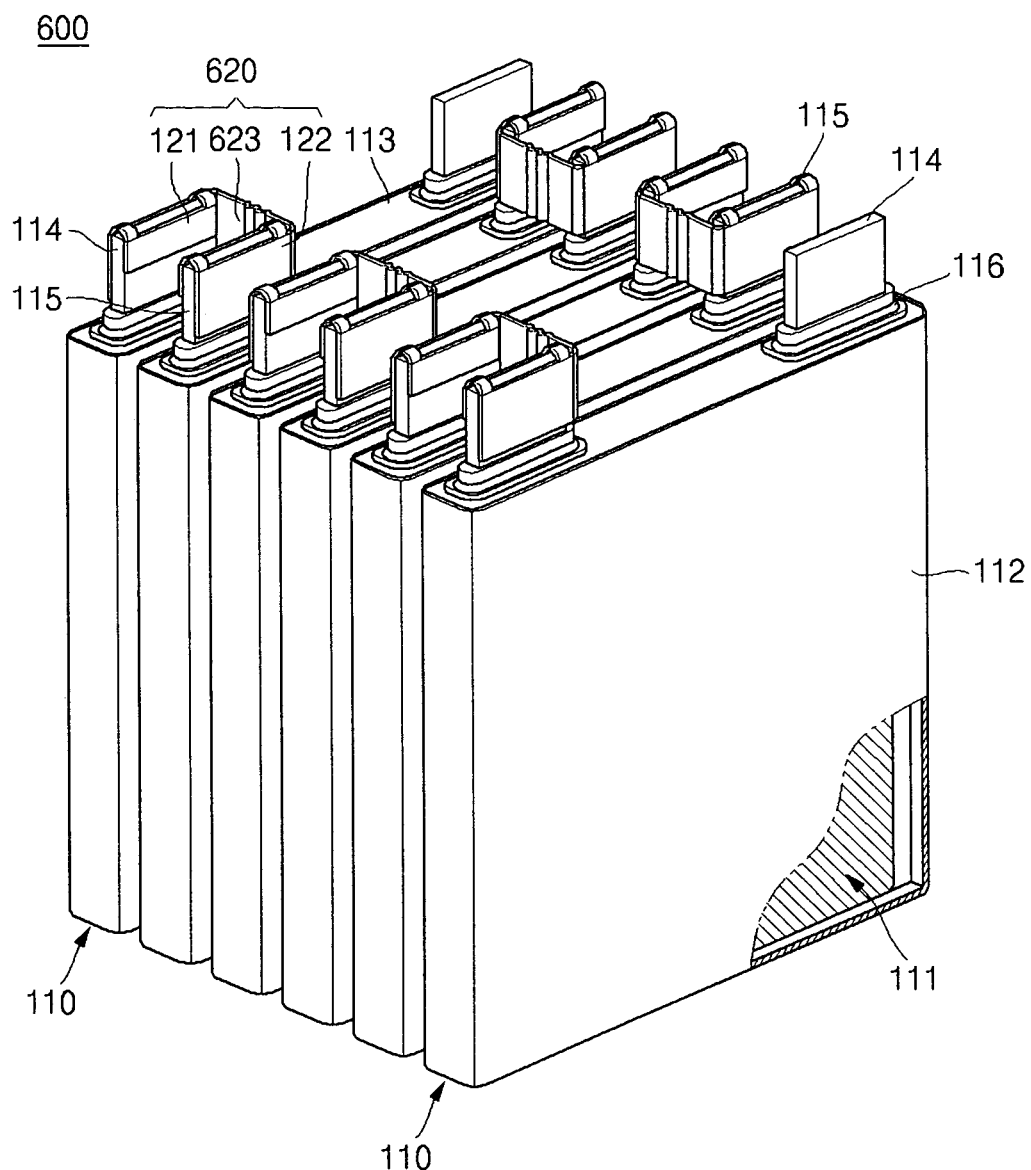
FIGS. 6a and 6b respectively illustrate a perspective view and a partially enlarged view of a secondary battery module according to still another embodiment.
Figure 6B:
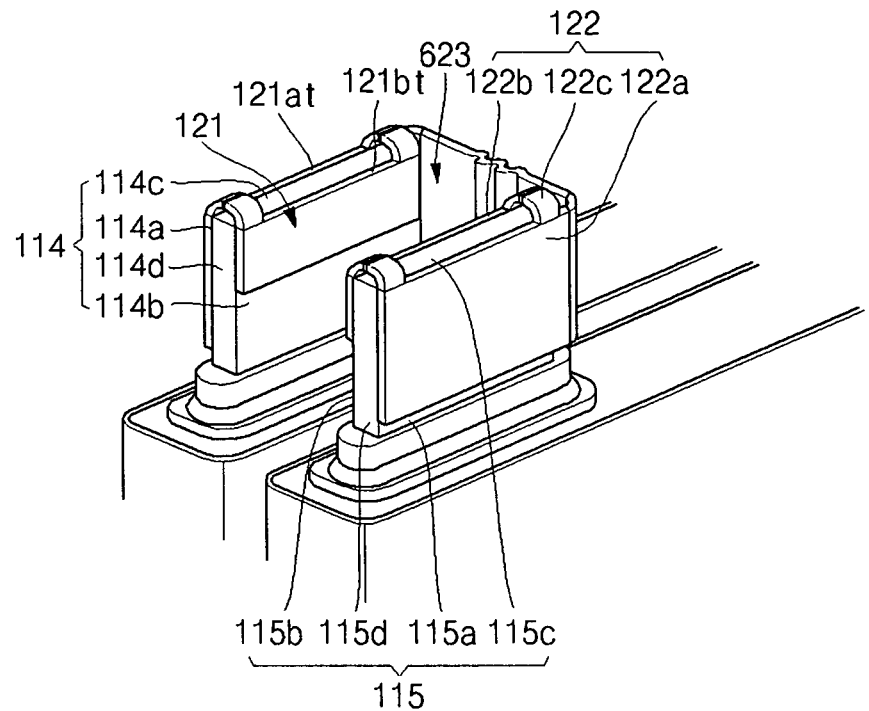
Figure 6C:
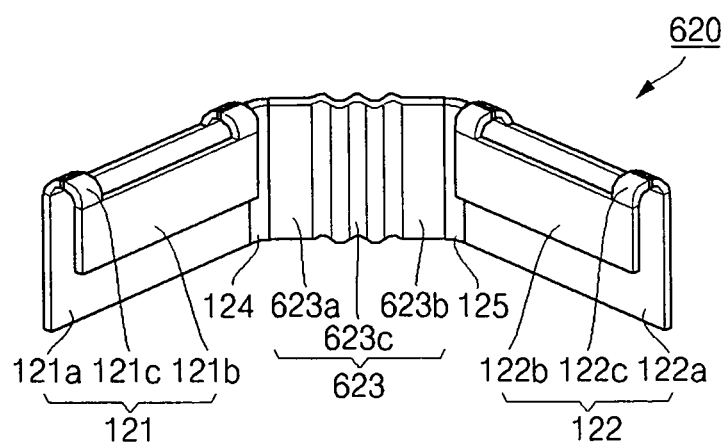
FIG. 6c illustrates an enlarged view of the bus bar of such secondary battery module.

Referring to FIG. 6a, a perspective view of a secondary battery module 600 according to still another embodiment is illustrated. Referring to FIG. 6b, a partially enlarged view of the secondary battery module 600 is illustrated. Referring to FIG. 6c, an enlarged view of a bus bar of the secondary battery module 600 is illustrated.

As illustrated in FIGS. 6a through 6c, the secondary battery module 600 of the present embodiment includes unit batteries 110 and bus bars 620. Each of the bus bars 620 may have a first coupling portion 121, a second coupling portion 122, a connecting portion 623, a first bent portion 124 and a second bent portion 125.

The unit batteries 110 of the secondary battery module 600 of the present embodiment may be the same as the unit batteries 110 of the secondary battery module 100 illustrated in FIGS. 1a and 1b. The first and second coupling portions 121 and 122 and the first and second bent portions 124 and 125 of the bus bars 620 may be the same as those of the bus bars 120 illustrated in FIGS. 1a through 1d in terms of their structures. Thus, only detailed explanations of the connecting portions 623 of the bus bars 620 different from those of the secondary battery module 100 will be provided below.

The connecting portion 623 may have, e.g., a plate shape, and may connect an end of the first contact portion 121a of the first coupling portion 121 and an opposing end of the third contact portion 122a of the second coupling portion 122. This connection may allow the bus bar 620 to have a "U" configuration.

The connecting portion 623 may include a first connecting portion 623a, a second connecting portion 623b and a third connecting portion 623c. The first connecting portion 623a may have, e.g., a flat plate shape, and may be disposed between and connect the first coupling portion 121 and the third connecting portion 623c. The second connecting portion 623b may have, e.g., a flat plate shape, and may be disposed between and connect the second coupling portion 122 and the third connecting portion 623c. The third connecting portion 623c may be corrugated to form one or more bent portions. The third connecting portion 623c may be interposed between and connect the first and second connecting portions 623a and 623b.

The corrugated connecting portion 623c between the first and second connecting portions 623a and 623b may enable the bus bar 620 to be properly coupled to the terminals of adjacent unit batteries 110 despite different distances between the unit batteries 110. The length of the connecting portion 623, which corresponds to the distance between the first and second coupling portions 121 and 122, may vary due to the corrugated connecting portion 623c. That is, the bus bars 620 may have a buffering effect against different distances between the unit batteries 110.

The connecting portion 623 may be connected to the first contact portion 121a of the first coupling portion 121 and the third contact portion 122a of the second coupling portion 122. The connecting portion 623, the first contact portion 121a and the third contact portion 122a may have the same height. The heights of the connecting portion 623 and the first and third contact portions 121a and 122a refer to the lengths thereof in a direction corresponding to the axial direction of the first and second terminals 114 and 115 of the unit batteries 110.

Ends of the connecting portion 623 may be thinner than a central portion thereof, as in the connecting portion 223 of the bus bar 220 illustrated in FIGS. 2a and 2b. This thickness difference may prevent the bus bar 620 from being improperly coupled to the terminals 114 and 115 of adjacent unit batteries 110 despite different distances between the unit batteries 110. That is, the bus bars 620 may have a desirable buffering effect against different distances between the unit batteries 110.

In the secondary battery module 600 of the present embodiment, the first and second terminals 114 and 115 of the unit batteries 110 may be precisely welded by, e.g., laser or ultrasonic welding, to the bus bars 620 on the upper surfaces thereof, which upper surfaces lie in the same plane as the bus bars 620. This welding may prevent short circuits between the first and second terminals 114 and 115 of the adjacent unit batteries 110 without being affected by the distance between the unit batteries 110.

In addition, the bus bars 620 may be temporarily fitted on the first and second terminals 114 and 115 of the unit batteries 110 through the clip-type first and second coupling portions 121 and 122 prior to welding. Furthermore, the height of the bus bars 620 may be easily controlled and maintained before welding of the bus bars 620 to the first and second terminals 114 and 115, in order for the welded portions to lie in the same plane. Moreover, since the connecting portions 623, each of which may have the corrugated connecting portion 623c, may have a larger thickness in the central portions thereof than at ends thereof, the secondary battery module 600 may have a buffering effect against different distances between the unit batteries 110.

As is apparent from the above description, in the secondary battery module according to such an embodiment, the upper surfaces of the terminals of the unit batteries may be precisely welded to the bus bars by, e.g., laser or ultrasonic welding, to prevent short circuits between the terminals.

In addition, in the secondary battery module of such an embodiment, the height of the clip-type bus bars may be easily controlled and maintained, and the position of the bus bars may be temporarily fixed before welding of the bus bars to the terminals.

Furthermore, the secondary battery module of such an embodiment may have a desirable buffering effect against different distances between the unit batteries by, e.g., making a difference in the thickness of the connecting portions of the bus bars, varying the connection structures between the connecting portions and the first coupling portions and between the connecting portions and the second coupling portions, or structurally modifying (e.g., corrugating or bending) the connecting portions.

Exemplary embodiments have been disclosed herein, and although specific terms are employed, they are used and are to be interpreted in a generic and descriptive sense only and not for the purpose of limitation. Accordingly, it will be understood by those of ordinary skill in the art that various changes in form and details may be made without departing from the spirit and scope of the present invention as set forth in the following claims.

What is claimed is:
1. A secondary battery module, comprising:
a plurality of unit batteries, each including a first terminal and a second terminal, and
a plurality of bus bars, each being welded to and electrically connecting the first terminal of one of the unit batteries to the second terminal of an adjacent unit battery, wherein:
the first terminal and second terminal each include a flat first contact surface and a flat second contact surface parallel with and opposite to the first contact surface,
the bus bars include a first coupling portion that is clip-coupled with the first terminal such that the first cou- pling portion is in contact with the first contact surface and the second contact surface of the first terminal of one of the unit batteries, a second coupling portion that is clip-coupled with the second terminal such that the second coupling portion is in contact with the first contact surface and the second contact surface of the second terminal of an adjacent unit battery, and a connecting portion connecting the first and second coupling portions, the first coupling portion of the bus bars includes:
 a first contact portion having an inner side surface in contact with the first contact surface of the first terminal,
 a second contact portion having an inner side surface in contact with the second contact surface of the first terminal, and
 an elastic first fixing portion connecting the first contact portion to the second contact portion, and the second coupling portion of the bus bars includes:
 a third contact portion having an inner side surface in contact with the first contact surface of the second terminal,
 a fourth contact portion having an inner side surface in contact with the second contact surface of the second terminal, and
 an elastic second fixing portion connecting the third contact portion to the fourth contact portion, the second contact portion of the first coupling portion of each bus bar has two lateral ends, the fourth contact portion of the second coupling portion has two lateral ends, and one lateral end of the second contact portion of the first coupling portion is diagonally opposed to one lateral end of the fourth contact portion of the second coupling portion, and each bus bar has a zigzag configuration in which the connecting portion connects the one lateral end of the second contact portion of the first coupling portion to the diagonally opposed one lateral end of the fourth contact portion of the second coupling portion.

2. The secondary battery module as claimed in claim 1, wherein the bus bars further include:
 a first bent portion between the first coupling portion and the connecting portion, and
 a second bent portion between the second coupling portion and the connecting portion.

3. The secondary battery module as claimed in claim 1, wherein the bus bars are arranged such that the second contact portion of the first coupling portions faces the fourth contact portion of the second coupling portions.

4. The secondary battery module as claimed in claim 1, wherein:
 the first and second terminal each have an upper surface having a central portion,
 the first fixing portion of the first coupling portion at least partially overlies the upper surface of the first terminal and exposes the central portion of the upper surface, and
 the second fixing portion of the second coupling portion at least partially overlies the upper surface of the second terminal and exposes the central portion of the upper surface.

5. The secondary battery module as claimed in claim 1, wherein:
 the first and second terminal each have an upper surface,
 the upper surface of the first terminal is welded to at least one of the first and second contact portions of the first coupling portion of one bus bar, and
 the upper surface of the second terminal is welded to at least one of the third and fourth contact portions of the second coupling portion of the one bus bar.

6. The secondary battery module as claimed in claim 1, wherein, in the first terminal and the second terminal:
 the second contact surface is parallel with the first contact surface, and
 the second contact surface faces a direction opposite to a direction in which the first contact surface faces.

7. The secondary battery module as claimed in claim 1, wherein each of the unit batteries are prismatic batteries.

8. The secondary battery module as claimed in claim 7, wherein the flat first contact surface and the flat second contact surface are parallel with a wide side surface of each of the prismatic batteries.

* * * * *